May 12, 1959     A. P. DILLON     2,886,670
ELECTRICAL CIRCUIT BREAKERS
Filed May 7, 1956
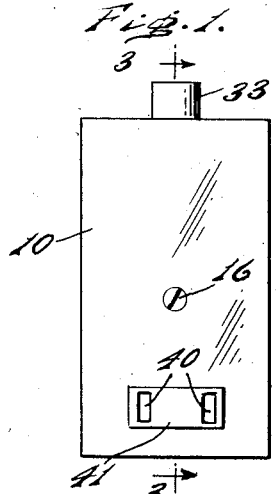
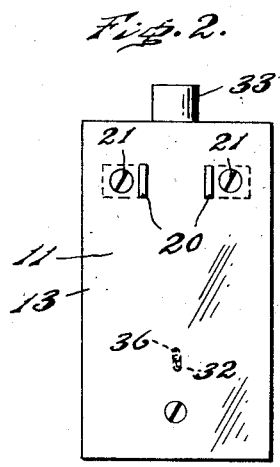
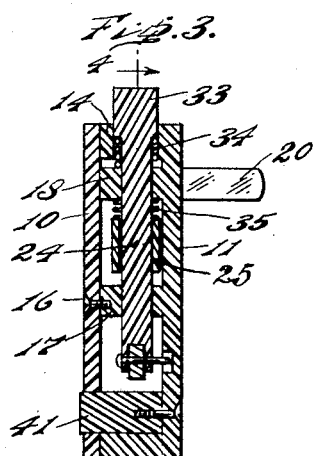
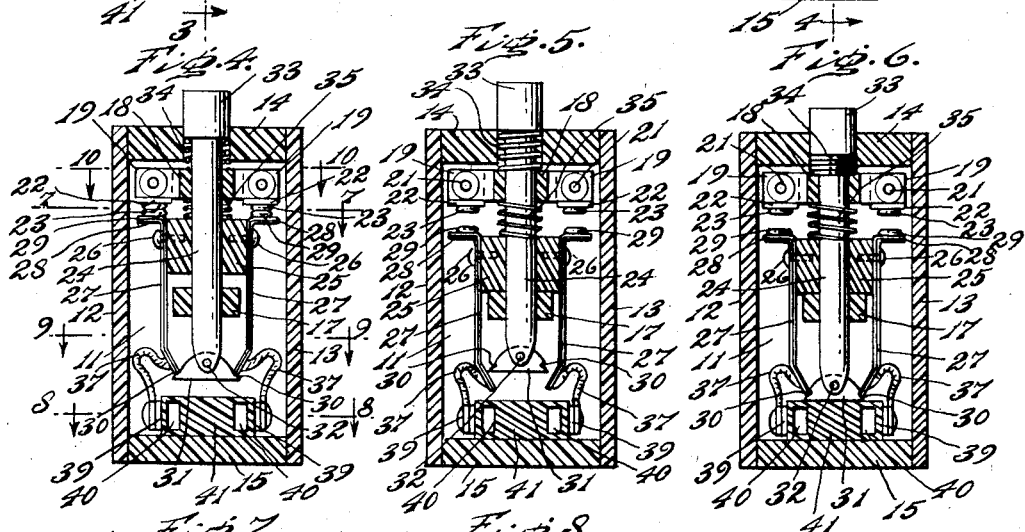
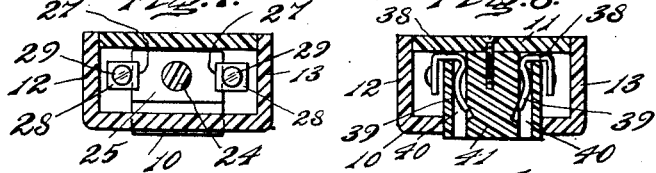
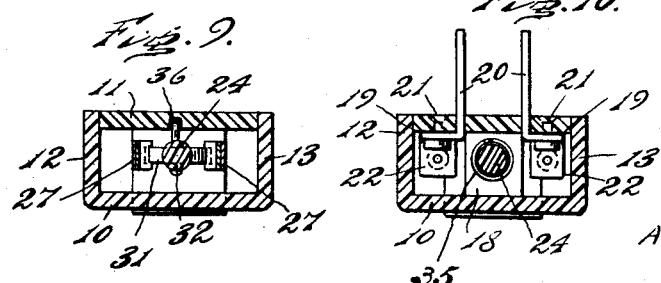
INVENTOR
Ambrose P. Dillon
BY
Jas. C. Hobensmith
ATTORNEY.

United States Patent Office 2,886,670
Patented May 12, 1959

2,886,670

ELECTRICAL CIRCUIT BREAKERS

Ambrose P. Dillon, Ardmore, Pa.

Application May 7, 1956, Serial No. 583,163

5 Claims. (Cl. 200—116)

This invention relates to electrical circuit breakers, that is, to devices adapted to be incorporated in electrical devices such as connectors, connection outlets, connection plugs or other similar devices, for the purpose of breaking the circuit in the event of an excess of current flow, and having improved means for indicating the breaking of the circuit and for resetting the device to operative condition after the fault causing an overload has been corrected.

Heretofore various overload circuit breaking devices have been suggested, some of which were designed to be interposed as an auxiliary between the outlet receptacle and the connection plug of an electrical appliance. In other instances, the same have been incorporated in the connection plugs, and in still other instances, have been incorporated in the outlet receptacle.

Some of the aforesaid devices were fuse controlled, but these were objectionable on account of the necessity of maintaining a supply of fuses of the proper capacity on hand. Others were operated by a thermally flexed bimetallic device which, when current of greater amperage than was required by the appliance was passed therethrough, would be flexed by the resultant heat, and a spring tensioned part would be released to open the circuit. The devices of the latter type were usually provided with means for indicating the opening of the circuit and for resetting the same after the fault causing the overload was corrected.

However, in the use of the devices of the character aforesaid, no account was taken of the fact that, in most house wiring systems one side of each circuit is usually neutral and grounded, and the other side of each circuit is "hot" or live, and in many instances the fault would occur on the live side of the circuit, and the connection plug would be so positioned that the circuit would be broken by the device only on the neutral or grounded side, and if the appliance should be so connected, a potential source of danger would exist by reason of the failure to open the circuit on the live side.

In my previous application for Letters Patent, filed February 17, 1955, Serial No. 488,804, there was shown and described an auxiliary electrical outlet connector having circuit breaker means incorporated therein which would serve to open the circuit on both sides whenever an excess or overload of current would flow on either side.

The principal object of the present invention is to provide an electrical circuit breaker of the same general character as that shown and described in my previous application above referred to but which, however, is so constructed and arranged as to avoid the possibility of the user improperly securing the resetting mechanism in such manner or position as to close the circuit without correcting the fault which caused the circuit breaker to open the circuit.

The nature and characteristic features of the present invention will be more readily understood from the following description, taken in connection with the accompanying drawing forming part thereof, in which:

Figure 1 is a front elevation of an electrical outlet connector having a circuit breaker embodying the main features of the present invention incorporated therein;

Fig. 2 is a rear elevation thereof;

Fig. 3 is a vertical central sectional view, taken approximately on the line 3—3 of Fig. 1;

Fig. 4 is a vertical central sectional view, taken approximately on the line 4—4 of Fig. 3, the same being shown with the parts in their operative positions, that is with the circuit closed and functioning normally.

Fig. 5 is a view similar to Fig. 4, but with the parts in the positions assumed when the circuit is opened by an excess of current flowing therethrough;

Fig. 6 is a view similar to Figs. 4 and 5, but with the parts in the positions assumed during the resetting action, showing how the circuit is maintained open when the resetting device is being operated or in the event of the user attempting improperly to close the circuit by securing the parts in that position;

Fig. 7 is a transverse section taken approximately on the line 7—7 of Fig. 4;

Fig. 8 is a transverse section taken on the line 8—8 of Fig. 4;

Fig. 9 is a transverse section taken on the line 9—9 of Fig. 4; and

Fig. 10 is a transverse section taken on the line 10—10 of Fig. 4.

It should, of course, be understood that the description and drawing herein are illustrative merely, and that various modifications and changes may be made in the structure and arrangement disclosed without departing from the spirit of the invention.

It should, also, be understood that while the invention is shown as applied to an auxiliary electrical outlet connector, it can also be used in other electrical devices such, for example, as connection devices and the like and also, the same may be built in electrical outlet receptacles as a component part thereof.

Referring to the drawing, in the particular embodiment of the invention therein shown, the housing is of a closed box-like form, made of two parts 10 and 11, which may be made in any practical manner, preferably by molding the same of insulating material.

The front portion 10 of the housing is provided with integral side walls 12 and 13, whereas the rear member 11 of the housing is provided at the top and bottom, respectively, with integral extensions 14 and 15 forming the end walls for closing the housing at said points.

The two portions of the housing may be secured to each other by means of a screw 16 passing through the front wall of part 10 and extending into a centrally disposed internal lug 17 extending forwardly from the rear wall of part 11 of the housing.

There is also provided internally, near the top of the housing, a forwardly extending lug 18. Adjacent the lug 18, on each side thereof, there is positioned the inner bent over end 19 of one of the pair of connection prongs 20, which may be secured in the housing by means of screws 21 extending through the rear wall of the part 11 of the housing.

The inner bent over end portions 19 of the connection prongs 20 are each provided with an extension 22, and each of said extensions is provided with a contact member 23.

Slidably mounted in the lugs 17 and 18 is a rod or staff 24, upon which midway the extremities a slidable block 25, of insulating material is mounted, and on each side of said block 25, there is secured, by means of a screw 26, a bimetallic member 27 which is adapted, when current of more than a predetermined amperage is passed therethrough, to be flexed by reason of the increase in temperature caused by the current overload.

Each of the bimetallic members 27 has, at the end secured to the block 25, a bent over portion 28 which carries a contact member 29 adapted, when the device is in the normal operating condition, to be in contact with a contact member 23, hereinbefore referred to. Each of the bimetallic members 27 at its free end, is bent inwardly and is adapted to engage a notch 30 in a rocking member 31 secured by a pivot pin 32 to the inner end of the rod or staff 24.

The outer end of the rod or staff 24 is provided with an enlarged head portion 33, thereby to provide a shoulder and a coil spring 34 is mounted on the rod 24, being interposed between the shoulder provided by the enlarged portion 33 and the internal lug 18.

Another coil spring 35 is interposed between the lug 18 and the block 25, of insulating material, which is mounted on the staff 24. It may here be noted that the tension of the spring 34 is appreciably greater than that of the spring 35, whereby, when the device is in the normal or operative condition, the rocking member 31 will be held in position with the ends of the bimetallic members 27 set in the notches 30 of said rocking member which is carried at the inner end of the rod 24.

The pivot pin 32, by means of which the rocking member 31 is mounted on the end of the rod 24, extends rearwardly into a vertical slot 36 in the rear wall of the housing part 11, thereby serving as a guide to prevent the rotation of the rod 24 and to maintain the rocking member 31 in proper position circumferentially to insure the engagements of the notches by the ends of the bimetallic members 27 in a manner to be present explained.

Each of the bimetallic members 27 is connected by means of a cable 37 to a connection member 38 which is suitably shaped and provided with a spring portion 39 extending into one of the slots 40 of a block 41 of insulating material secured between the two parts 10 and 11 of the housing. Each of the slots 40 is adapted to receive one of the connection prongs of a plug connector carried at the end of a connection cable extending to an electrical appliance, so that said appliance will be connected by the engagement of the connection prongs with the spring members 39.

The operation of the device of the present invention will now be readily understood. When the device is in the normal or operating condition, the parts will be in the relative positions as shown in Fig. 4 of the drawing. The device being connected in an electrical circuit of the kind commonly used in dwellings, if an overload of current should flow on either side, the bimetallic member 27 on that side will be flexed by reason of the heat caused by the excess current flowing therethrough, and when either one of said bimetallic members 27 is thus flexed, the end thereof will become disengaged from the rocking member 31 whereupon, the coil spring 34 will cause the rod 24 to be moved outwardly. At the same time, the coil spring 35 will cause the block 25, which is slidably mounted thereon, to be pushed to the position shown in Fig. 5 of the drawing, to encounter the internal lug 17, which serves to limit the amount of movement of the same.

The bimetallic members 27 will then be in the positions as shown in Fig. 5 of the drawing and the contact members 29 carried by said bimetallic members 27 will be freed from their respective contact members 23 which are carried on the inner ends of the connection prongs 20, and the circuit will thus be opened on both sides thereof.

For the purpose of resetting the device, it is only necessary to push the rod 24 inwardly by the manual actuation of the enlarged head portion 33 of the rod 24 until the rocking member 31 is brought to a position at or beyond the ends of the bimetallic members 27, whereupon said bimetallic members 27 will be carried upwardly to the position shown in Fig. 4 of the drawing, by the spring 34, to cause the contact members 29 to again engage the contact members 23 to reestablish the circuit on both sides.

It will be noted, however, that should anyone improperly attempt to secure or fasten the rod 24 in the innermost position, for the purpose of improperly establishing and maintaining the circuit, such procedure will be of no avail with the device as hereinbefore described, as the tension of the coil spring 35 bearing against the block 25 which carries the bimetallic members 27 will hold said members in the open positions, as shown in Fig. 6, and the parts will remain in that position until the rod 24 is released.

It will be seen that by the foregoing arrangement there is provided an electrical circuit breaker, adapted to be used in conjunction with electrical circuits having a "live" side and a neutral side, by means of which the circuit will be opened on both sides, and will remain open on both sides, in the event that an excess of current should flow on either side of the circuit, and that the device is constructed and arranged as to render the same tamper proof in that any attempt to secure or hold the parts in the resetting position will only serve to maintain the circuit in the open condition.

I claim:

1. An overload circuit breaker device of the character described, for use in an electrical circuit having two sides in electrical parallel, said device including a pair of movably mounted thermally flexed members electrically connected respectively one in each of the two sides of the circuit, means for opening said circuit on both sides thereof upon passage of excess current through one of the thermally flexed members on either side of the circuit, and means for resetting the parts to operative position including a member movably mounted with respect to the thermally flexed members and having a portion projecting externally for manual operation thereof, thereby providing means for maintaining the circuit open on both sides thereof until the resetting of the parts is completed.

2. An overload circuit breaker device of the character described, for use in an electrical circuit having two sides in electrical parallel, said device including a pair of movably mounted thermally flexed members electrically connected respectively one in each of the two sides of the circuit, means for opening said circuit on both sides thereof upon passage of excess current through one of the thermally flexed members on either side of the circuit, and means for resetting the parts to operative position including a member movably mounted with respect to the thermally flexed members and having a portion projecting externally for manual operation thereof, said member being pressed inwardly to reset the parts, thereby providing means for maintaining the circuit open on both sides thereof when said member is in its extreme inwardly pressed position.

3. An overload circuit breaker device of the character described, for use in an electrical circuit having two sides in electrical parallel, said device including a pair of movably mounted thermally flexed members electrically connected respectively one in each of the two sides of the circuit, a pair of contact members on each side normally in engagement to maintain the circuit in closed condition on each side thereof, means for separating said contacts on both sides of the circuit upon passage of excess current through one of the thermally flexed members on either side of the circuit, and means for indicating the opening and closing of the circuit and for resetting the parts to operative position including a member movably mounted with respect to the thermally flexed members and having a portion projecting externally for manual operation thereof, thereby providing means for maintaining the contacts on both sides of the circuit in separated condition during the actuation of said movable member to the reset condition.

4. An overload circuit breaker device of the character described, for use in an electrical circuit having two sides in electrical parallel, said device including a pair of thermally flexed members electrically connected respectively one in each of the two sides of the circuit, a pair of contact members on each side of the circuit normally in engagement to maintain the circuit in closed condition on each side thereof, means for separating said contacts on both sides of the circuit upon passage of excess current through one of the thermally flexed members on either side of the circuit, means for indicating the opening and closing of the circuit and for resetting the parts to operative position including a movable member having a portion projecting externally for manual operation thereof, and means for maintaining the contacts on both sides of the circuit in separated condition during the actuation of said movable member to the reset condition, and the thermally flexed members being movably mounted with respect to the aforesaid movable resetting member.

5. An overload circuit breaker device of the character described, for use in an electrical circuit having two sides in electrical parallel, said device including a pair of thermally flexed members electrically connected respectively one in each of the two sides of the circuit, a pair of contact members on each side of the circuit normally in engagement to maintain the circuit in closed condition on each side of the circuit, means for separating said contacts on both sides of the circuit upon passage of excess current through one of the thermally flexed members on either side of the circuit, means for indicating the opening and closing of the circuit and for resetting the parts to operative position including a movable member having a portion projecting externally for manual operation thereof, and means for maintaining the contacts on both sides of the circuit in separated condition during the actuation of said movable member to the reset condition, the thermally flexed members being movably mounted with respect to the aforesaid movable resetting member, and means for mechanically connecting said resetting members and said thermally flexed members to each other to reset the device.

References Cited in the file of this patent

UNITED STATES PATENTS

| | | |
|---|---|---|
| 1,939,194 | Angell | Dec. 12, 1933 |
| 2,070,305 | Jennings | Feb. 9, 1937 |
| 2,229,843 | Frank et al. | Jan. 28, 1941 |
| 2,567,361 | Bean | Sept. 11, 1951 |
| 2,639,348 | Ingwersen | May 19, 1953 |
| 2,664,480 | Elliott | Dec. 29, 1953 |
| 2,755,358 | Dobes et al. | July 17, 1956 |

FOREIGN PATENTS

| | | |
|---|---|---|
| 427,512 | Great Britain | Apr. 25, 1935 |
| 537,900 | Germany | Nov. 7, 1931 |